US008688068B2

(12) United States Patent
Yang

(10) Patent No.: US 8,688,068 B2
(45) Date of Patent: Apr. 1, 2014

(54) SYSTEM AND METHOD FOR TEMPORARILY RECONFIGURING A COMMUNICATIONS SYSTEM TO PROVIDE SELECTION SERVICES

(71) Applicant: FutureWei Technologies, Inc., Plano, TX (US)

(72) Inventor: Yunsong Yang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/886,906

(22) Filed: May 3, 2013

(65) Prior Publication Data
US 2013/0267190 A1 Oct. 10, 2013

Related U.S. Application Data

(62) Division of application No. 13/587,747, filed on Aug. 16, 2012, now Pat. No. 8,437,799, which is a division of application No. 12/815,088, filed on Jun. 14, 2010, now Pat. No. 8,270,977.

(60) Provisional application No. 61/218,792, filed on Jun. 19, 2009.

(51) Int. Cl.
*H04W 88/02* (2009.01)

(52) U.S. Cl.
USPC ....................................... 455/404.1

(58) Field of Classification Search
USPC ........ 455/552.1, 436–444, 404.1, 411, 422.1, 455/423, 434, 509
See application file for complete search history.

(56) References Cited

U.S. PATENT DOCUMENTS

2012/0106423 A1* 5/2012 Nylander et al. ............. 370/311

* cited by examiner

*Primary Examiner* — Diane Mizrahi
(74) *Attorney, Agent, or Firm* — Slater & Matsil, LLP

(57) ABSTRACT

A system and method for temporarily reconfiguring a communications system to provide selected services are provided. A method for temporarily providing selected services by a cell of a communications system includes receiving a first command, changing an operating mode of the cell responsive to the first command, and indicating the operating mode to a first selected device and a first non-selected device. The cell operating in the operating mode serves the first selected device based on the first command, and the first non-selected device is a selected device prior to the change in the operating mode and is capable of accessing the cell before the cell changes the operating mode responsive to the first command and is not capable of accessing the cell after the cell changes the operating mode responsive to the first command.

10 Claims, 8 Drawing Sheets

SYSTEM AND METHOD FOR TEMPORARILY RECONFIGURING A COMMUNICATIONS SYSTEM TO PROVIDE SELECTION SERVICES

This application is a divisional of U.S. application Ser. No. 13/587,747, filed on Aug. 16, 2012, entitled "System and Method for Temporarily Reconfiguring a Communications System to Provide Selected Services," which is a divisional of U.S. application Ser. No. 12/815,088, filed on Jun. 14, 2010, entitled "System and Method for Temporarily Reconfiguring a Communications System to Provide Selected Services", which claims the benefit of U.S. Provisional Application No. 61/218,792, filed on Jun. 19, 2009, entitled "Method and System for Temporarily Reconfiguring a Cell to Provide Selected Services," which applications are hereby incorporated herein by reference.

TECHNICAL FIELD

The present invention relates generally to a system and method wireless communications, and more particularly to a system and method for temporarily reconfiguring a communications system to provide selected services.

BACKGROUND

In a 4G wireless communications system such as a Third Generation Partnership Project (3GPP) long term evolution (LTE) compliant communications system, after a regular enhanced NodeB (eNB), which is also known as a base station (BS), is deployed, the operator of the communications system may wish to optimize the cell coverage and performance provided by the eNB equipment by conducting tests that only involve testing user equipments (UEs) and the eNB. The testing UEs can record testing data and thereby helps to identify potential problems. Therefore, the testing UE should be allowed to camp on, to access, and to receive services from the testing eNB (i.e., the eNB operating in a test mode of operation) as a regular UE camps on, accesses, and receives services from a regular eNB. After the testing and optimization is complete, the operator may turn the testing eNB to a regular eNB (i.e., place the testing eNB into a normal mode of operation) in order to provide commercial services.

During testing, it may be desirable to prevent a regular UE from impacting the testing or otherwise creating un-desirable network traffic at the testing eNB. For example, if an idle regular UE camps on the testing eNB, when the communications system wants to page the idle regular UE due to an incoming call, the communications system will create undesirable paging traffic at the testing eNB. For another example, if a neighboring eNB that is operating in a normal mode of operations tries to handover an active regular UE to the testing eNB, although the testing eNB is capable of rejecting the handover request, the handover attempt still creates un-desirable backhaul signaling for the testing eNB.

Furthermore, in an emergency situation, it may be desirable to only allow certain emergency personnel to have access to a communication system while the communication system automatically blocks all communications with all regular end users except when a regular end user originates an emergency, e.g., a 911, E911, or so on, call using his or her regular UE in the communication system. The exception is aimed to allow the victims of the emergency situation to call for help.

SUMMARY OF THE INVENTION

These and other problems are generally solved or circumvented, and technical advantages are generally achieved, by preferred embodiments of the present invention which provides a system and method for temporarily reconfiguring a communications system to provide selected services.

In accordance with a preferred embodiment of the present invention, a method for temporarily providing selected services by a cell of a communications system is provided. The method includes receiving a first command, changing an operating mode of the cell responsive to the first command, and indicating the operating mode to a first selected device and a first non-selected device. The cell operating in the operating mode serves the first selected device based on the first command, and the first non-selected device is a selected device prior to the change in the operating mode and is capable of accessing the cell before the cell changes the operating mode responsive to the first command and is not capable of accessing the cell after the cell changes the operating mode responsive to the first command.

In accordance with another preferred embodiment of the present invention, a method for operations by a communications device is provided. The method includes determining if a communications controller is broadcasting an operating mode indicator, continuing to access the communications controller if the communications controller is not broadcasting the operating mode indicator or in response to determining that the operating mode indicator indicates that the communications device is a selected communications device, and searching for an alternate communications controller if the communications controller is broadcasting the operating mode indicator and if the operating mode indicator indicates that the communications device is a non-selected communications device. The operating mode indicator indicates selected communications devices and non-selected communications devices.

In accordance with another preferred embodiment of the present invention, a communications controller is provided. The communications controller includes a receiver to be coupled to a receive antenna, a transmitter to be coupled to a transmit antenna, a memory, and a controller coupled to the receiver, to the transmitter, and to the memory. The receiver receives signals detected by the receive antenna, the transmitter transmits signals with the transmit antenna, and the memory stores a closed subscriber group (CSG) identifier-to-operating mode map, and a CSG identifier. The controller processes an operating mode command, and switches an operating mode based on the operating mode command.

An advantage of an embodiment is that a communications system may be dedicated for exclusive use in test and/or emergency situations while still providing the ability to support users placing emergency calls without requiring significant signaling overhead or changes to technical standards.

A further advantage of an embodiment is that the exclusivity of the usage of the communications system can readily and quickly be turned on or off.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a 3GPP LTE compliant communications system supporting exclusive test and/or emergency use. The invention may also be applied, however, to other communications systems, such as those that are 3GPP LTE-Advanced, WiMAX, or so forth, compliant.

Figure 1:
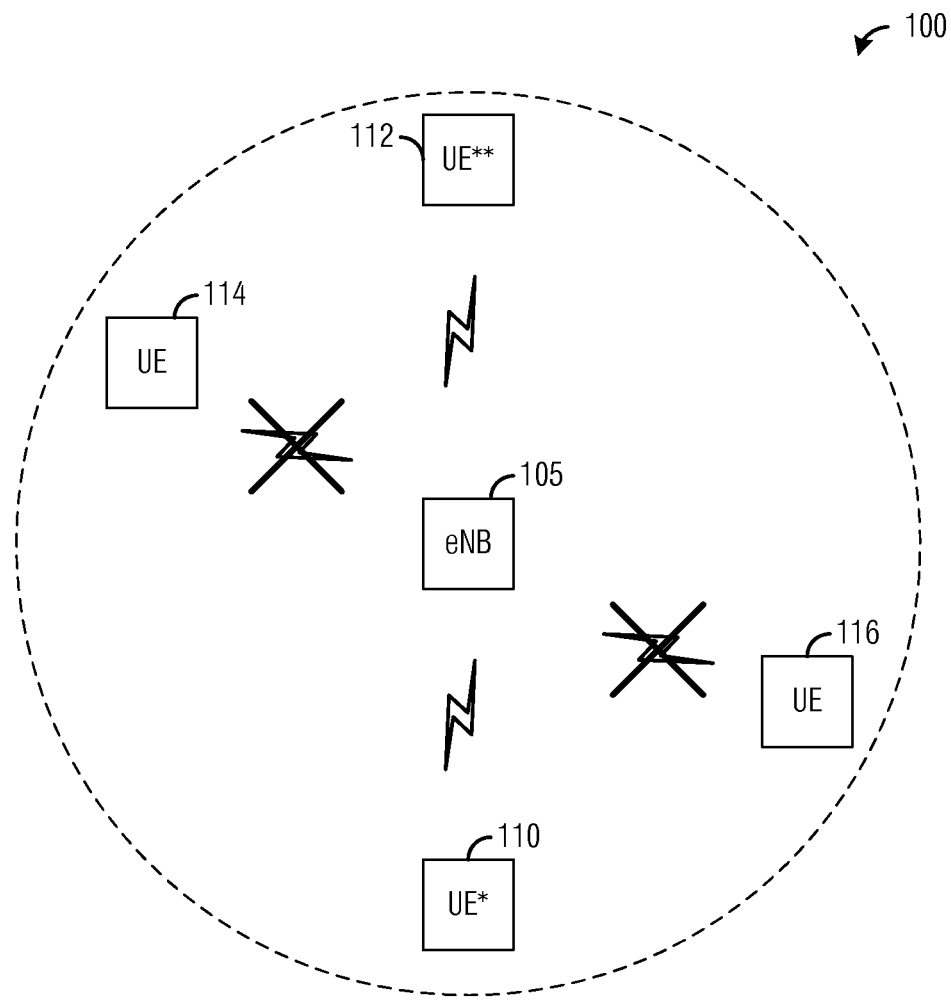
FIG. 1 is a diagram of a communications system.

FIG. 1 illustrates a communications system 100. Communications system 100 includes an eNB 105 serving a number of UEs. For reasons, such as testing and/or emergency situations, communications system 100 may wish to provide service to only a subset of UEs that are operating within its coverage area and would normally be served by eNB 105. For example, UE 110 (labeled UE*) may be a test UE that may be used to test the operation of communications system 100 or UE 110 may be an emergency services UE used by a fireman helping to put out a fire. Therefore, when communications system 100 is in a test mode or an emergency mode, UE 110 should be served by eNB 105.

Additionally, UE 112 (labeled UE**) may be a normal UE being used by its user to make an emergency call, e.g., 911, E911, or so on. Generally, regulations require that UEs being used to make an emergency call be allowed service independent of them having authorization to access communications system 100. Therefore, UE 112 should be served by eNB 105, however, only while it is being used to make an emergency call.

Also shown in FIG. 1 are UE 114 and UE 116 (each labeled UE). UE 114 and UE 116 may be normal UEs that are not involved in making an emergency call. Therefore, communications system 100 does not serve UE 114 and UE 116. In order to obtain service, UE 114 and UE 116 may need to search elsewhere for service.

According to an embodiment, it may be desired to prevent eNB camping, call setup, and incoming handovers for all but a selected group of UEs (also referred to as selected UEs), which may include testing UEs, emergency UEs, UEs owned and/or operated by a particular company, service, or user, and so forth. A primary intention may be to allow only the selected group of UEs to access a communications system during a specified period. For example, during an optimization phase for a communications system, only testing UEs may be allowed access to the communications system. Other UEs (non-testing UEs) may not be served.

UEs that are not selected UEs (also referred to as non-selected UEs) may also not be served. For example, non-testing UEs may not be served since their presence in the communication system may have a negative impact on the testing being performed and the resulting test results. An exception to limiting access to only the selected group of UEs may be a UE that is a non-selected UE being used to make an emergency call. Typically, governmental regulations require that service be provided to compatible UEs that are attempting to make an emergency call. Therefore, such UEs may be served and the test results may be adjusted due to the presence of the non-selected UEs making emergency calls and/or the testing may be repeated.

Figure 2A:
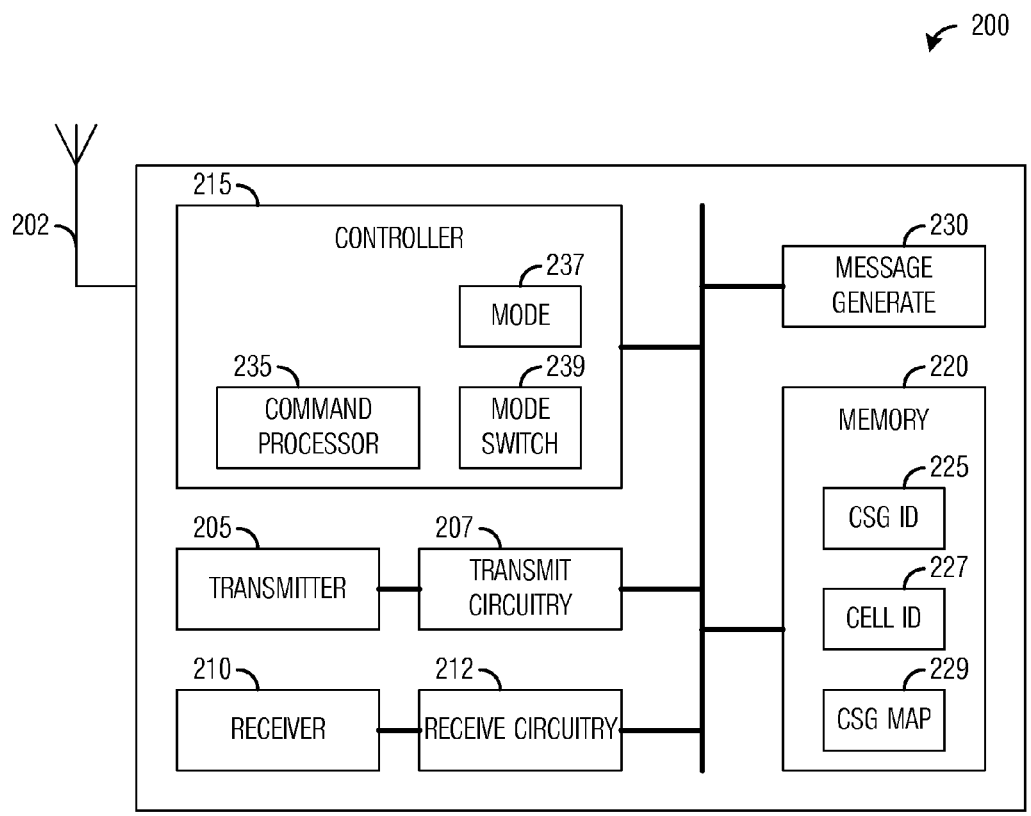
FIG. 2a is a diagram of an eNB.

FIG. 2a illustrates an eNB 200. eNB 200 may be representative of an eNB of a communications system. eNB 200 may control communications to UEs served by eNB 200. Additionally, eNB 200 may control access to a communications system that includes eNB 200 to UEs depending on whether or not the UEs are selected UEs or non-selected UEs and a particular operating mode of eNB 200. As an example, if eNB 200 is in a testing mode, then eNB 200 may only allow service to UEs that are testing UEs. Furthermore, if eNB 200 is in an emergency mode, then eNB 200 may only allow service to UEs that are emergency UEs, i.e., UEs used by emergency personnel. However, at any time, eNB 200 may allow service to a non-selected UE if the non-selected UE is attempting to make an emergency call.

eNB 200 may have at least one antenna 202. Antenna 202 may serve as both a transmit antenna and a receive antenna. Alternatively, eNB 200 may have separate transmit and receive antennas. eNB 200 may also have a wireline connection, such as a backhaul connection, to other network components, such as other eNBs, serving gateways (S-GWs), mobility management entities (MMEs), and so forth. Coupled to antenna 202 may be a transmitter 205 used to transmit information over the air using antenna 202. Transmitter circuitry 207 coupled to transmitter 205 may provide signal processing for information being transmitted. Examples of signal processing provided by transmitter circuitry 207 may include filtering, amplifying, modulating, error encoding, parallel-to-serial converting, interleaving, bit puncturing, and so forth.

Also coupled to antenna 202 may be a receiver 210 used to receive information detected by antenna 202. Receiver circuitry 212 coupled to receiver 210 may provide signal processing for received information. Examples of signal processing provided by receiver circuitry 212 may include filtering, amplifying, demodulating, error detecting and correcting, serial-to-parallel converting, de-interleaving, and so on. As used herein, transmitter 205 and receiver 210 may be a wireless transmitter and receiver as well as a wireline transmitter and receiver.

As used herein, receiver and transmitter may apply to both wireless and wireline receivers and transmitters. Therefore, the use of receiver and/or transmitter should not be construed as being limiting to either the scope or spirit of the embodiments.

A controller 215 may be a processing unit responsible for executing applications and programs, controlling operations of various components of eNB 200, processing and granting transmission requests, handovers, and so on from UEs being served by or attempting to get service from eNB 200, and so forth. As discussed previously, eNB 200 may serve UEs based on their membership in a select group of UEs and/or an operating mode of eNB 200, which may be set by a command received by eNB 200. The command to set the operating mode of eNB 200 may be provided to eNB 200 by an operation and maintenance (OAM) system that is a part of the communications system. To support controller 215 in serving UEs, eNB 200 includes a memory 220 and message generate unit 230.

Memory 220 may be used to store information and applications. Furthermore, memory 220 may be used to store a closed subscriber group identifier (CSG ID) in a CSG ID store 225 that may indicate a current CSG (if any) being served by eNB 200. CSG ID may be a number value, a text string, or an alphanumeric string. For example, if eNB 200 is in an operating mode where it is serving all compatible UEs, then eNB 200 may not have a CSG ID. While if eNB 200 is only serving testing UEs, then CSG ID store 225 may store a value corresponding to a CSG ID for testing UEs. Similarly, if eNB 200 is only serving emergency UEs, then CSG ID store 225 may store a value corresponding to a CSG ID for emergency UEs.

Memory 220 may also store a cell identifier (CELL ID) in a CELL ID store 227. CELL ID store 227 may be used to store an identifier corresponding to a cell of eNB 200. According to an embodiment, CELL ID store 227 may be a unique identifier for the cell(s) of eNB 200 within a limited area (i.e., a CELL ID may not necessarily be unique and same CELL ID may be re-used by other eNBs in other geographic areas) and may or may not change depending on the operating mode of eNB 200. Furthermore, the CELL ID may fall within a first range of CELL IDs, indicating that eNB 200 is a femto cell. Alternatively, the CELL ID may fall within a second range of CELL IDs, indicating that eNB 200 is not a femto cell.

Memory 220 may also have a CSG map 229 that may store multiple CSG IDs for different modes and/or groups of selected UEs. For example, CSG map 229 may store a CSG ID for a number of testing UE groups, emergency UE groups, user class groups, and so forth. Then, based on a command from the OAM system, an appropriate CSG ID may be selected from CSG map 229. As an example, in a fire emergency, a CSG ID for a local fire department and a local police department may be selected. Alternatively, in a very large fire emergency, a CSG ID for all fire departments and police departments may be selected.

Message generate unit 230 may be used to generate messages that contain a CSG indicator. According to an embodiment, if the current operating mode of the eNB is to serve only the UEs of a closed subscriber group, the CSG indicator will be set to "True" (or a specified value representing a logical true), otherwise it will be set to "False" (or a specified value representing a logical false). If the CSG indicator is set to "True", the message generated by message generate unit 230 may further include CSG ID of the current CSG being served by eNB 200. Message generate unit 230 may include the CSG ID in a generic broadcast message transmitted to all UEs within an operating area of eNB 200. The CSG ID may be transmitted in its own broadcast message or it may be included in a broadcast message transmitted with other information, such as a pilot signal, a paging channel, or so on.

Message generate unit 230 may also include in an additional message indicating the CELL ID of eNB 200. The additional message may be transmitted on a channel different from the message indicating the current operating mode of the eNB (i.e., the message containing the CSG indicator and potentially the CSG ID).

Controller 215 may include a command processor 235 which may be used to process commands received from the OAM system. As an example, eNB 200 may receive a command to enter a testing mode from the OAM system. Command processor 235 may process the command and perform operations needed to place eNB 200 into the testing mode. Command processor 235 may set a MODE flag 237 that may indicate an operating mode of eNB 200 to the testing mode and initiate an operating mode switch in mode switch unit 239. Command processor 235 may select an appropriate CSG ID from CSG map 229 based on the command provided by the OAM system. In another embodiment, the OAM system may provide, in the command, the CSG ID associated with the particular mode that the OAM system has commanded eNB 200 to be placed into.

Mode switch unit 239 may initiate message generate unit 230 to broadcast the CSG ID to indicate the CSG being served by eNB 200. Mode switch unit 239 may also store the selected CSG ID in CSG ID store 225.

Figure 2B:
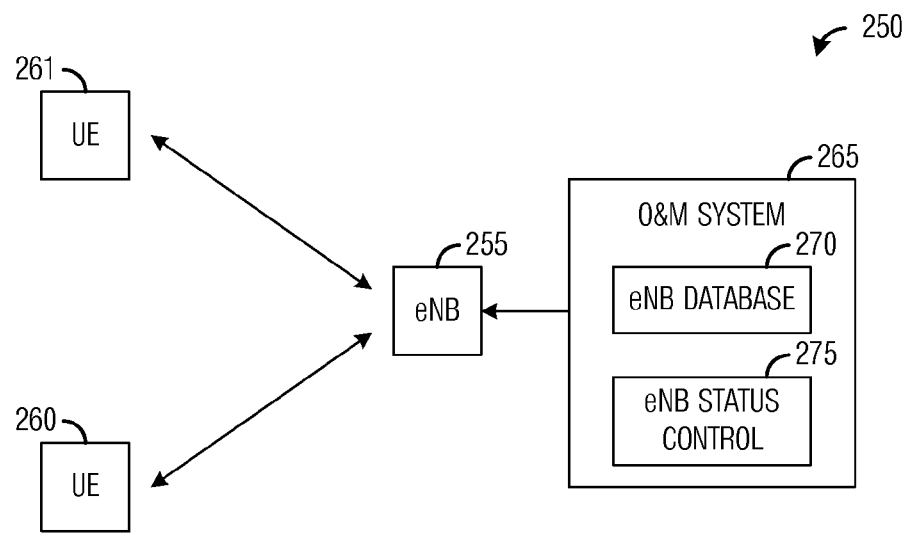
FIG. 2b is a diagram of a high-level view of a communications system.

FIG. 2b illustrates a high-level view of a communications system 250. Communications system 250 includes an eNB 255 capable of serving a plurality of UEs, such as UE 260 and UE 261. Communications system 250 also includes OAM system 265 that may be used to control the operating mode of eNB 255. Through controlling the operating mode of eNB 255, OAM system 265 may determine which UEs eNB 255 may serve, for example.

An eNB database 270 may be used to store information such as an operating mode, location, and so forth, of the eNB in communications system 250, while an eNB status control unit 275 may be used to control the operating mode of the eNBs in communications system 250. eNB status control unit 275 may be used to generate commands that may be provided to the eNBs to set the operating mode of the eNBs. For example, eNB status control unit 275 may determine that eNB 255 may be set to operate in a testing mode and may send an appropriate command to eNB 255 to cause eNB 255 to switch to the testing mode.

eNB status control unit 275 may access eNB database 270 to determine the operating modes of the eNBs. For example, OAM system 265 may determine that eNB 255 is located near a large fire and may set the operating mode of eNB 255 to the emergency mode so that only emergency UEs may get service from eNB 255. By restricting eNB 255 to only emergency UEs and UEs making emergency calls, eNB 255 may have sufficient resources to serve the emergency UEs.

Although the discussion focuses on eNB 200 and eNB 255 being macro-cell eNBs with large service areas and capable of supporting a large number of UEs, the embodiments described herein may be operable to any form of eNB, including small scale femto-cell and micro-cell eNBs. Therefore, the discussion of macro-cell eNBs should not be construed as being limiting to either the scope or the spirit of the embodiments.

For discussion purposes, assume that there is a fire in a first building and there is a femto-cell eNB owned and operated by a subscriber in a second building located adjacent to the first building. OAM system 265 may be able to determine that the femto-cell eNB is adjacent to the first building and provides good coverage over the first building. OAM system 265 may send a command to the femto-cell eNB to switch the femto-cell eNB from its current operating mode to an emergency mode to provide service to UEs of a local fire department fighting the fire. Usually, the femto-cell eNB may be configured to serve only UEs registered to the owner of the femto-cell eNB. However, it may be possible, through a service agreement with the owner, for the service provider to temporarily switch the operating mode of the femto-cell eNB while there is a fire emergency nearby.

According to 3GPP LTE specifications, if an eNB is a femto-cell eNB, which is also known as the home eNB or HeNB, the home eNB can be configured with an home eNB name, which is a text string. The home eNB name may be broadcasted, for example in the systeminformationblock-type9 message in LTE, and thereby may be displayed on a screen on a UE so as to help the end user to recognize a particular femto-cell eNB. According to another embodiment, when the operator temporarily switches the operating mode of the femto-cell eNB of a consumer in order to serve a local fire department, the operator may change the home eNB name of the femto-cell eNB to a text string that may be displayed on the screen of the owner's UE so as to avoid the owner's complaint about losing services.

Figure 3A:
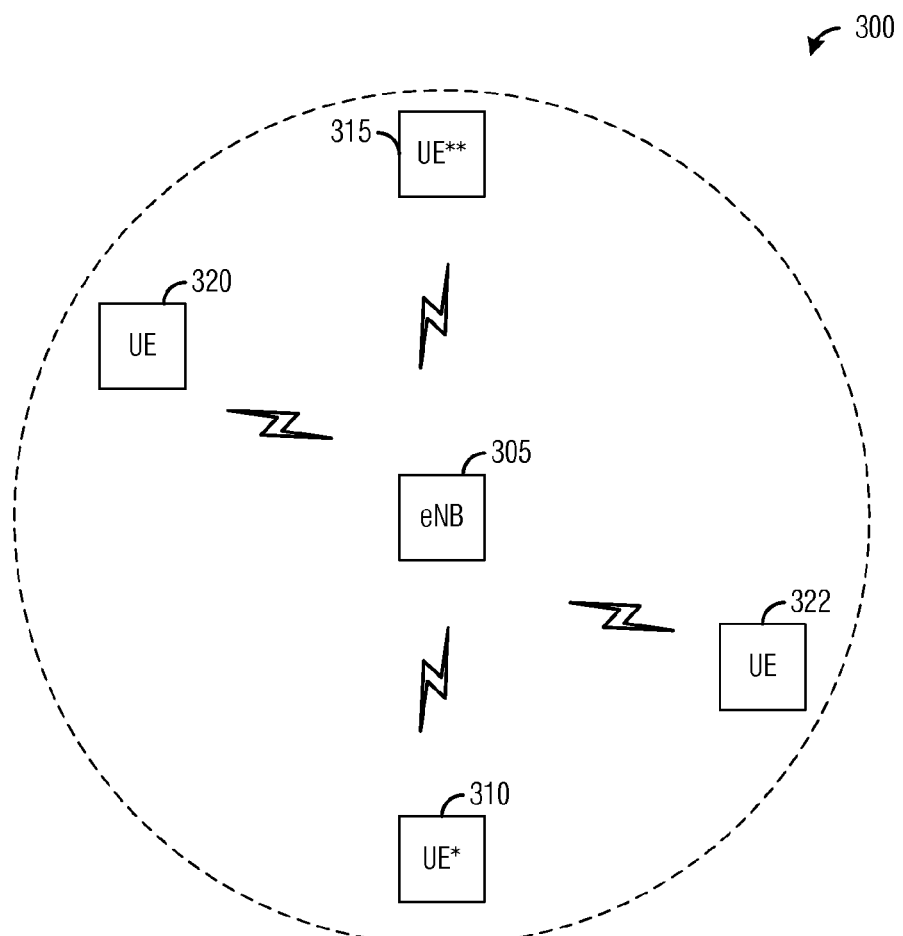
FIG. 3a is a diagram of a communications system, wherein the communications system includes an eNB operating in a normal operating mode.

FIG. 3a illustrates a communications system 300, wherein communications system 300 includes an eNB 305 operating in a normal operating mode. When eNB 305 is operating in the normal operating, eNB 305 may support all compatible and authorized UEs (up to a maximum number of supportable UEs). The UEs supported by eNB 305 may include testing UEs (such as UE 310), normal UEs making emergency calls (such as UE 315), and normal UEs (such as UE 320 and UE 322).

Figure 3B:
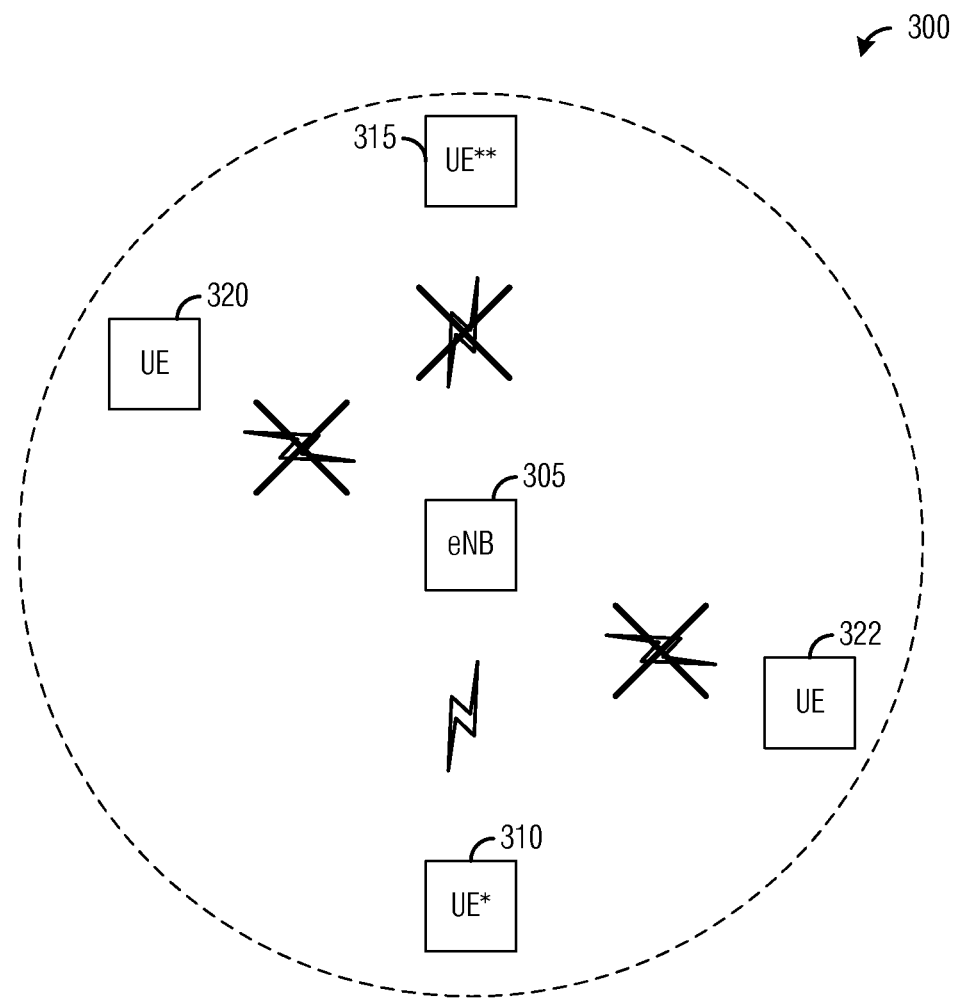
FIG. 3b is a diagram of a communications system, wherein the communications system includes an eNB operating in a testing mode.

FIG. 3b illustrates communications system 300, wherein communications system 300 includes eNB 305 operating in a testing mode. While operating in the testing mode, eNB 305 may not serve UEs that are not selected UEs, i.e., eNB 305 may not serve non-testing UEs. Therefore, only UE 310 is served by eNB 305. UE 315, which may be a normal UE that is not making an emergency call, is also not served by eNB 305. Similarly, UE 320 and UE 322 are not served by eNB 305.

Figure 3C:
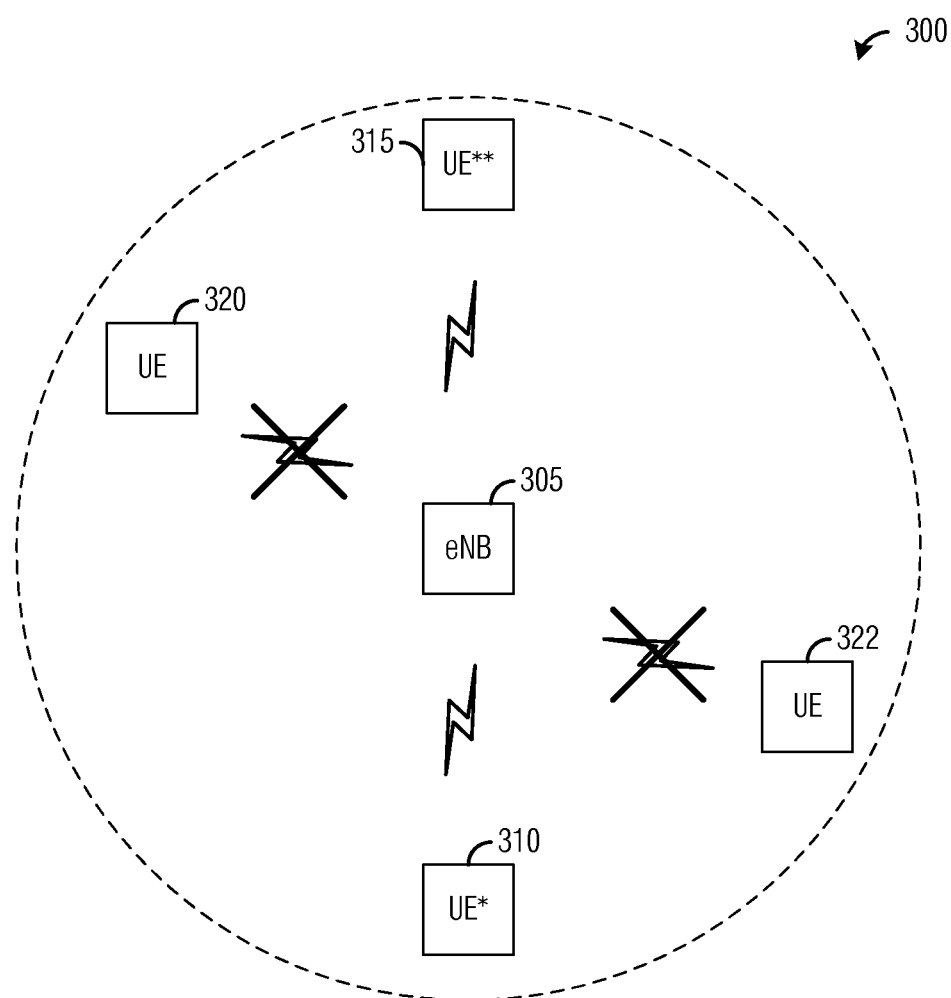
FIG. 3c is a diagram of a communications system, wherein the communications system includes an eNB operating in a testing mode and is serving a normal UE making an emergency call.

FIG. 3c illustrates communications system 300, wherein communications system 300 includes eNB 305 operating in a testing mode and is serving a normal UE making an emergency call. While operating in the testing mode, eNB 305 may not serve UEs that are not selected UEs, i.e., eNB 305 may not serve non-testing UEs. Therefore, only UE 310 is served by eNB 305. However, UE 315, which may be a normal UE, is making an emergency call and may then be served by eNB 305. Once again, UE 320 and UE 322 are not served by eNB 305.

Figure 4:
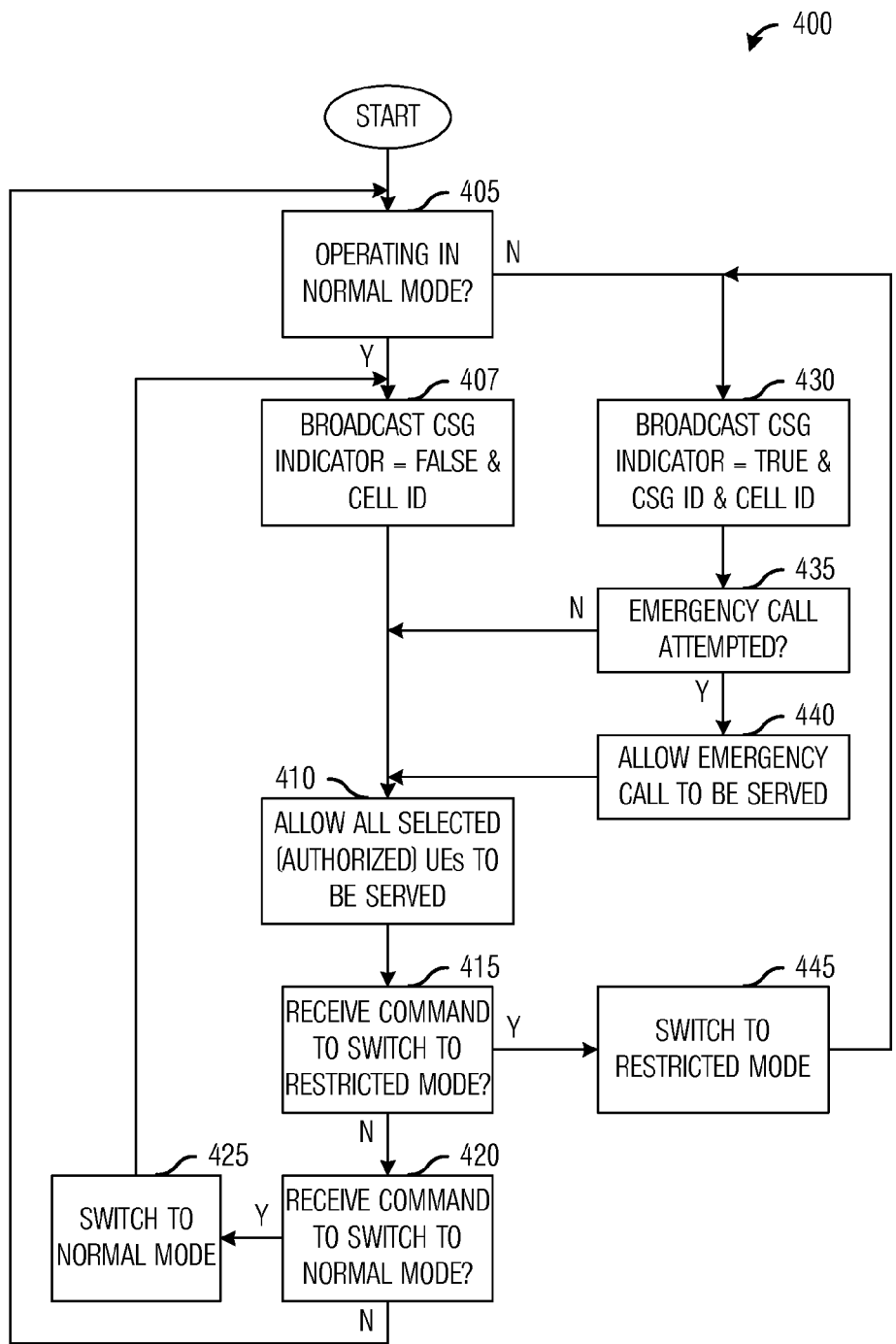
FIG. 4 is a flow diagram of eNB operations in serving UEs.

FIG. 4 illustrates a flow diagram of eNB operations 400 in serving UEs. eNB operations 400 may be indicative of operations occurring in an eNB, such as eNB 200, that is serving UEs, wherein the eNB may serve all compatible and authorized UEs or selected UEs and UEs making emergency calls. eNB operations 400 may occur while the eNB is serving UEs.

eNB operations 400 may begin with the eNB performing a check to determine if it is operating in a normal mode (block 405). If the eNB is operating in a normal mode, then the eNB may indicate that it is operating in the normal mode by broadcasting a CSG indicator with a "False" value (block 407). Furthermore, the eNB may not broadcast a CSG ID. According to an alternative embodiment, the eNB may broadcast a CSG ID set to a specified value to indicate that it is operating in the normal mode. In addition to broadcasting the CSG indicator, the eNB may broadcast, in another message, a CELL ID, which may be used by UEs in cell selection. Furthermore, when the broadcasted CSG indicator indicates "False", the broadcasted Cell ID is within the second range of CELL ID values indicating that the eNB is not a femto cell.

When receiving such a broadcasted CSG indicator, all compatible and authorized UEs may be part of the selected UEs that can be served. Then the eNB serves all selected UEs (block 410). Serving the UEs may include allowing the UEs to camp with the eNB, allowing call setups, allowing handovers, and so forth.

In general, selected UEs may vary depending upon the mode of the eNB. For example, if the eNB is operating in the normal mode, then all compatible UEs may be selected UEs, as long as they may be authenticated for access to the communications system. While, if the eNB is operating in a restricted mode, then selected UEs may be a subset of all compatible UEs. As an example, if the eNB is operating in a testing mode, then selected UEs may comprise testing UEs corresponding to a particular testing being performed. Similarly, if the eNB is operating in an emergency mode, then selected UEs may comprise emergency UEs corresponding to the particular emergency, e.g., if the emergency is a fire emergency, then the selected UEs may be UEs of the local fire department, while if the emergency is a police emergency, then the selected UEs may be UEs of the local police department, and so forth.

The eNB may perform a check to determine if it has received a command, from an OAM system, for example, to switch to a restricted mode (block 415). As discussed previously, a command from the OAM system may cause the eNB to switch from the normal mode to a restricted mode wherein only selected UEs may be served (along with compatible and authorized UEs making emergency calls) with the selected UEs being based on the restricted mode. Examples of restricted modes may include testing mode, emergency mode, owner mode (wherein only UEs owned by a specified owner are served), class mode (wherein only UEs of a specified class are served), and so forth.

The eNB may also perform a check to determine if it has received a command, also from the OAM system, for example, to switch to the normal mode (block 420). The command to switch to the normal mode from the restricted mode may be similar to a command to switch from the normal mode to the restricted mode. If the eNB receives such a command, the eNB may switch to the normal mode (block 425) and return to block 407. The eNB may indicate that it has switched back to the normal mode by broadcasting the CSG indicator with a "False" value and with or without broadcasting the CSG ID (block 407), which allows all compatible and authorized UEs service. The eNB may also broadcast its CELL ID with a value within the second range of CELL IDs in a separate message.

If the eNB is not operating in the normal mode (block 405), then eNB may be operating in a restricted mode. The eNB may indicate that it is operating in a restricted mode by broadcasting the CSG indicator with a "True" value and the CSG ID corresponding to the selected UEs that it is serving (block 430). In addition, the eNB may broadcast its CELL ID with a value within the first range of CELL IDs in a separate message. As an example, if the eNB is operating in a testing mode, then the eNB may indicate that it is operating in the testing mode by transmitting the CSG indicator with a "True" value and a CSG ID corresponding to selected UEs that are testing UEs. Similarly, if the eNB is operating in an emergency mode, the eNB may indicate that it is operating in the emergency mode by transmitting the CSG indicator with a "True" value and a CSG ID corresponding to selected UEs that are emergency UEs.

Even while operating in a restricted mode, the eNB may need to allow UEs attempting to make an emergency call service. The eNB may perform a check to determine if there is a UE that is not a selected UE, which is attempting to make an emergency call (block 435). If there is such a UE, the eNB may serve the UE and allow the emergency call to be served (block 440). The eNB may return to block 410 to allow all selected UEs, which happens to be the selected UEs corresponding to the restricted mode or service.

If the eNB has received a command to switch to the restricted mode (block 415), then the eNB may switch to the restricted mode as indicated by the command (block 445) and indicate to the UEs that it is operating in the restricted mode by broadcasting the CSG indicator with a "True" value and a CSG ID corresponding to the restricted mode (block 430).

If the eNB does not receive either a command to switch to the restricted mode (block 415) or a command to switch to the normal mode (block 420), the eNB may return to block 405.

eNB operations 400 may continue until the eNB has been reset, powered down, or otherwise removed from service. Alternatively, eNB operations 400 may continue until the eNB is placed in a mode where it does not switch between different modes dependent on a command received from the OAM system.

Figure 5:
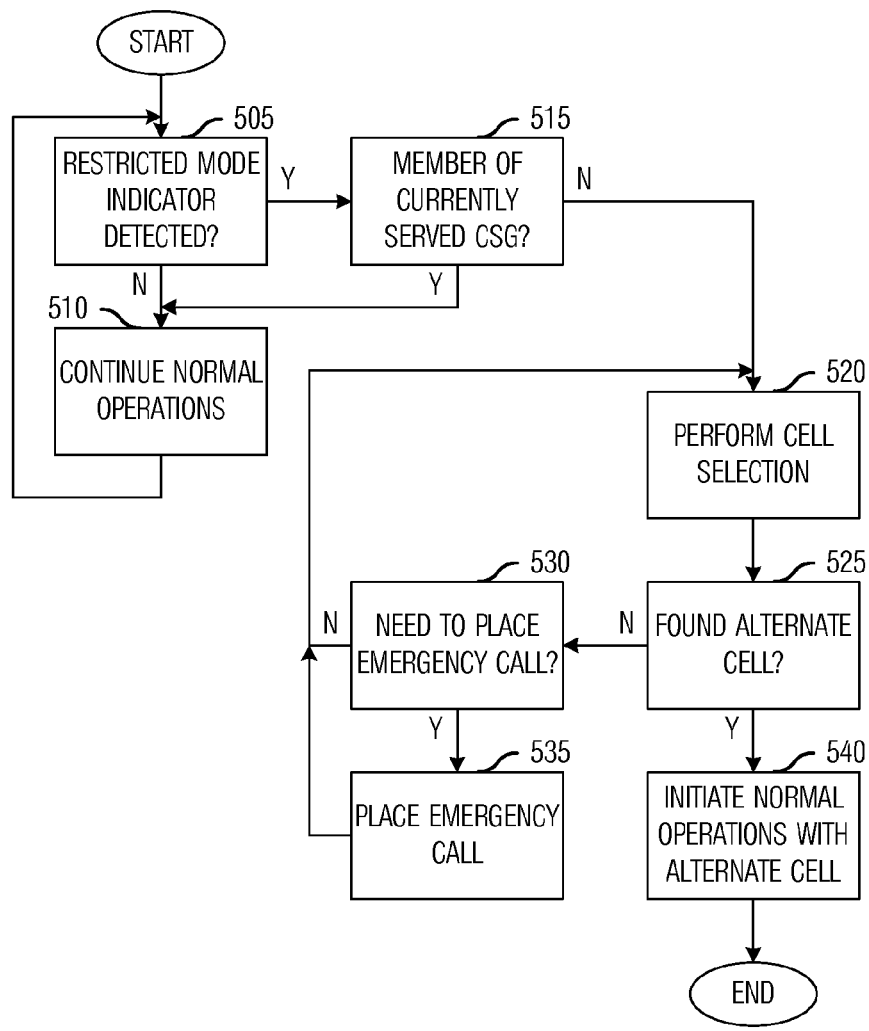
FIG. 5 is a flow diagram of UE operations.

FIG. 5 illustrates a flow diagram of UE operations 500. UE operations 500 may be indicative of operations taking place at a UE as the UE attempts to obtain service from an eNB and potentially make an emergency call. UE operations 500 may occur while the UE is in a normal operating mode and while the UE detects at least one eNB that may be capable of serving the UE.

UE operations 500 may begin with the UE performing a check to determine if the eNB is broadcasting a restricted mode indicator (block 505), e.g. if the broadcasted CSG indicator is "True" or not. According to an embodiment, the eNB may broadcast a CSG indicator with a "True" value and a CSG ID when it is operating in a restricted mode. Therefore, the UE may be able to determine if the eNB is operating in a restricted mode if it detects that the eNB is broadcasting the CSG indicator with a "True" value.

If the eNB is not operating in a restricted mode, then the UE may continue with its normal operations, which may include camping on the eNB, attempting to setup a call (emergency or otherwise), participating in a handover, and so forth (block 510). The UE may return to block 505 to detect additional broadcasts from the eNB.

If the UE detects that the eNB is operating in a restricted mode, then the UE may perform another check to determine if it is a member of the CSG as indicated by the CSG ID broadcast by the eNB (block 515). In general, the UE may have stored in its memory, normally a read-only memory, the CSG or CSGs of which it is a member. If the UE is a member of the CSG as indicated by the CSG ID, then the UE may continue normal operations (block 510).

However, if the UE is not a member of the CSG as indicated by the CSG ID broadcasted by the current eNB, then the UE may perform cell selection in order to find service at an alternate cell (eNB) (block 520). The UE may perform a check to determine if it has been able to find an alternate cell (block 525). If the UE has been able to find an alternate cell, then the UE may initiate normal operations with the alternate cell (block 540) and UE operations 500 may then terminate. However, if the UE has not been able to find an alternate cell, then the UE may perform a check to determine if the UE needs to place an emergency call (block 530). If yes, the UE may go ahead and place the emergency call using the current eNB (block 535). If no or after the UE finishes the emergency call, the UE may return to block 520 to continue its search for an alternative cell where it may receive service.

Although the discussion presented above focuses on a switching the operating mode of an entirety of available bandwidth when the eNB switches operating modes, it may be possible that the eNB switches only a portion of the available bandwidth. As an example, if the eNB controls network resources corresponding to 20 MHz of bandwidth, it may be possible for the eNB to make 10 MHz of the bandwidth available to any compatible UE, while operating in a restricted mode in the remaining 10 MHz of bandwidth allowing access only to selected UEs corresponding to the restricted mode.

The available bandwidth may also be partitioned into multiple portions. For example, the available bandwidth may be partitioned into three portions, with a first portion allowing access to all compatible UEs (i.e., a normal mode), a second portion allowing access to selected first UEs (i.e, a first restricted mode), and a third portion allowing access to selected second UEs (i.e., a second restricted mode).

Advantageous features of embodiments of the invention may include: A method for temporarily providing selected services by reconfiguring a wireless communication cell, comprising: changing a CSG status of the cell upon a command; indicating the changing of the CSG status of the cell to a selected UE and a non-selected UE causing the non-selected UE to cease its access of a non-selected service from the cell. The method could further include, providing services comprise of providing services to a selected UE. The method could further include, providing services comprise of providing a selected service to a non-selected UE. The method could further include, changing of the CSG status of the cell further comprises of changing a physical cell identity of the cell. The method could further include, changing of the CSG status of the cell further comprises of changing a closed subscriber group indicator of the cell. The method could further include, changing of the CSG status of the cell further comprises of changing a closed subscriber group identity of the cell. The method could further include, changing the CSG status of the cell back to the original state upon another command; and indicating the changing of the CSG status of the cell back to the original state to the UE causing the non-selected UE to resume its access of services from the cell.

Advantageous features of embodiments of the invention may include: An Operation and Maintenance (OAM) system, comprising: means to communicate with a cell; means to change one or more parameters at the cell causing the cell to provide selected services; and means to change the parameters back causing the cell to provide regular services.

Advantageous features of embodiments of the invention may include: An emergency communication system, compromising: a wireless communication cell that provides regular services under a normal circumstance and is capable to provide selected services under such a command; an operation and maintenance system that include means to change one or more parameters at the cell causing the cell to provide services to selected UEs and to provide selected services to non-selected UEs; and a UE including means to identify the UE as a selected UE. The method could further include, means to locate an emergency situation; and means to identify a cell that is close to the emergency situation and is capable to provide selected services Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications controller comprising:
   a receiver configured to be coupled to a receive antenna and to receive signals detected by the receive antenna;
   a transmitter configured to be coupled to a transmit antenna and to transmit signals via the transmit antenna;
   a memory configured to store a closed subscriber group (CSG) identifier-to-operating mode map and a CSG identifier; and
   a controller coupled to the receiver, to the transmitter, and to the memory, the controller configured to process an operating mode command, and to switch an operating mode in accordance with the operating mode command.

2. The communications controller of claim 1, wherein the controller comprises:
   a command processor configured to process the operating mode command; and
   a mode switch unit coupled to the command processor, the mode switch unit configured to initiate a switch in the operating mode in accordance with the operating mode command.

3. The communications controller of claim 2, further comprising a message generate unit coupled to the controller, the message generate unit configured to identify a CSG identifier (ID) or a CSG indicator value associated with the operating mode.

4. The communications controller of claim 3, wherein the message includes the CSG ID or the CSG indicator value.

5. The communications controller of claim 1, wherein the controller is further configured to allow a communications device to make a connection to an emergency service independent of the operating mode of the communications controller.

6. A communications controller comprising:
   a processor; and
   a computer readable storage medium storing programming for execution by the processor, the programming including instructions to:
   process an operating mode command;
   switch an operating mode to a switched operating mode in accordance with the operating mode command; and
   transmit a message including a closed subscriber group (CSG) indicator in accordance with the switched operating mode.

7. The communications controller of claim 6, wherein the programming further includes an instruction to:
   determine a CSG identifier (ID) or a CSG indicator value in accordance with the operating mode command.

8. The communications controller of claim 7, wherein the CSG ID is included in the message.

9. The communications controller of claim 7, wherein the CSG indicator value is included in the message.

10. The communications controller of claim 6, wherein the programming further includes an instruction to:
    allow a communications device to make a connection to an emergency service independent of the operating mode of the communications controller.

* * * * *